United States Patent [19]

Filss et al.

[11] Patent Number: 4,917,873

[45] Date of Patent: Apr. 17, 1990

[54] PROCESS AND APPARATUS FOR CLEANING HOT GASES

[75] Inventors: Peter Filss, Jülich; Wolfgang Heidrich, Düren, both of Fed. Rep. of Germany

[73] Assignee: Kernforschungsanlage Jülich Gesellschaft mit beschränkter Haftung, Jülich, Fed. Rep. of Germany

[21] Appl. No.: 218,471

[22] Filed: Jul. 6, 1988

Related U.S. Application Data

[63] Continuation of Ser. No. 75,285, Jul. 20, 1987, abandoned, which is a continuation of Ser. No. 870,776, Jun. 4, 1986, abandoned.

[30] Foreign Application Priority Data

Jun. 8, 1985 [DE] Fed. Rep. of Germany ....... 3520671

[51] Int. Cl.$^4$ .......................... B01J 8/00; B01J 20/00; C01B 7/00; B05D 3/02
[52] U.S. Cl. .................................. 423/239; 423/240; 423/244; 423/DIG. 9; 423/DIG. 13; 427/397.7; 502/22; 502/400; 502/402; 502/411
[58] Field of Search ................... 423/239, 240, 244 A, 423/DIG. 9, DIG. 13, 244 R; 427/397.7, 397.2; 502/411, 402, 400, 22

[56] References Cited

U.S. PATENT DOCUMENTS

| 3,907,967 | 9/1975 | Filss | 423/210 |
|---|---|---|---|
| 4,036,597 | 7/1977 | Filss | 23/284 |
| 4,070,300 | 1/1978 | Moroni et al. | 423/239 |
| 4,091,076 | 5/1978 | Vogel et al. | 423/244 A |
| 4,102,980 | 7/1978 | Susaki et al. | 423/DIG. 13 |
| 4,183,823 | 1/1980 | George | 502/22 |
| 4,214,881 | 7/1980 | Filss | 55/28 |
| 4,278,645 | 7/1981 | Filss | 423/210 |
| 4,535,072 | 8/1985 | Kitayama et al. | 502/411 |

OTHER PUBLICATIONS

Perry's Chemical Engineering Handbook, 6th edition, 1984, pp. 18–20, 18–23.
CRC Handbook of Chemistry and Physics, 62nd edition, 1981, pp. B–147, B–148, B–149.
Chemical Engineer's Handbook, p. 685, J. H. Perry McGraw Book Corp. Inc., 1950.

*Primary Examiner*—Gary P. Straub
*Assistant Examiner*—Lori F. Cuomo
*Attorney, Agent, or Firm*—Frishauf, Holtz, Goodman & Woodward

[57] ABSTRACT

In order to clean gases containing noxious components by contacting the gases with a solid material layer adhering to carrier bodies, the solid material layer is applied to the carrier body by wetting with an impregnating solution and then drying the solution on the carrier bodies. After being used up by reaction with the gases to be cleaned, the solid material layer is removed from the carrier bodies, after which it can be replaced by wetting with impregnating solution and drying again. The carrier bodies are stationary and the impregnating solution is trickled over them. Once the carrier bodies are wetted, irrigation with the impregnation solution is interrupted and the solution is dried on the carrier bodies. When the gas reaction at the solid material layer thus formed weakens, the stationary carrier bodies are re-irrigated with impregnation solution and dried. After many repeated impregnations the solid material layer is washed away by flushing or flooding the carrier bodies with a wash solution.

9 Claims, 4 Drawing Sheets

PROCESS AND APPARATUS FOR CLEANING HOT GASES

This application is a continuation of application Ser. No. 075,285 filed July 20, 1987 now abandoned which was a continuation of application Ser. No. 870,776 filed June 4, 1986 now abandoned.

This invention concerns the cleaning of hot gases and particularly the cleaning of waste furnace gases or other hot gases from an industrial process which it is desired to clean before allowing them to escape into the atmosphere.

In the cleaning of industrial waste gases, the separation of noxious gas components that are molecularly dispersed is of particular importance. In this connection, the principal noxious gas molecules include HCl, HF, $SO_2$ and the oxides of nitrogen ($No_x$).

It is known, for example, to combine such materials into harmless or removable compounds in the very combustion chamber of firing stages of industrial processes, for example, by addition of lime, or else to clean the waste gases in scrubbing towers with washing solutions. Waste gas washing has the advantage that a suitable washing solution can be selected for every noxious component to be held back from the gas being released and even to provide successive detoxifying stages for various components. Such washing of gases, however, can be carried out only in a limited temperature range because of the moistening of the gases to be cleaned that is connected with the washing process. Moreover, reheating of the clean gases is, in general, necessary.

A process for cleaning gases is known from U.S. Pat. No. 3,907,967 and German Pat. No. 22 36 389 in which the waste gases are caused to flow in contact with layers of solid material with which the noxious gas components react chemically. The solid material layers in this case are produced on rotating plates dipping into a solution, on which plates a solid material layer is produced out of the film of the solution that rises with the plate portion coming out of the solution. A film of the solution then adheres to the rotating plate and the solvent is dried out of the film by utilizing the heat of the hot exhaust gases flowing between adjacent rotating plates. As the result of the rotation of the plates, the solid material layers are continuously applied to the plate surfaces and then are dissolved away from the plates after the reaction with the noxious components of the waste gases.

Manufacturing and economic considerations set limits on the apparatus size and thereby on the maximum gas throughput per apparatus for the process above-described. Furthermore, in the removal from the gas of aggressive materials, special protection is necessary for the bearings of the rotating parts.

SUMMARY OF THE INVENTION

It is an object of the present invention to provide solid material layers for reaction with molecularly dispersed noxious components of hot waste gases and to apply such layers on carrier bodies which are fixed in place within the gas cleaning apparatus and to devise the application, drying and removal of the solid material layers in a manner that to a great extent is free of wearing effect on the carriers.

Briefly, an impregnating solution is applied to the carrier body in a manner similar to the provision of a trickling film of liquids (wetted wall column) either on an open stack of carrier bodies or on packed columns of carrier bodies, after which this film is dried on the carrier bodies. After the completion of this impregnation of the carrier bodies, the solid material layer formed on them reacts with the noxious gas components of hot waste gases flowing past the solid material layer. The noxious gas molecules reach the surface of the solid material layer on the carrier bodies by diffusion or by turbulent motion and become bound there by chemical reactions. When the reactivity of the layer diminishes with the accumulation of bound noxious gas molecules, an impregnating solution is applied anew on the carrier bodies and dried there. Such a renewal of the solid material layer can be successfully produced a number of times and is carried out until a solid material layer thickness is reached which results in excessively high energy losses mainly because of the increasing resistance to flow for the waste gas passing through the coated carrier body aggregate or until the reaction capability of the solid material layers in spite of additional impregnation, is no longer sufficient, or else in the event spontaneous separation of the solid material layer from the carrier body is to be feared. When additional impregnation steps are no longer economical, the carrier bodies are cleaned and are again ready for impregnation after the cleaning process has been completed. The process cycle then begins anew.

The advantages of the process of the invention lie particularly in the fact that the cleaning of hot gases by solid material layers succeeds after relatively short impregnation phases without requiring that the carrier bodies for the solid material layers be kept in motion within the apparatus. It is also important that after the completion of the impregnation phase, the waste gases come into contact only with a dried solid material layer and disturbance of the solid material reaction by vaporizing solvent, as well as moistening of the waste gas, is avoided.

The hot waste gases themselves are useful for drying the liquid film initially formed. The hotter these gases are, the shorter is the drying time in comparison with the reaction time of the solid material layer. During the impregnation step, the hot gas flow can be throttled down or the gases flowing through the reaction area can be recycled by first leading them through a water vapor separator in order to control most effectively the formation of steam and the wetting of the carrier bodies with impregnating solution.

A spent solid material layer can be removed from the carrier bodies by shaking or by knocking it off. For a cleaning of the carrier bodies without damage to them, it is preferable to flush them first, especially by flooding them, with a washing solution into which the solid material layer dissolves. For accelerating the removal process, the washing solution can be squirted on in pulses, impelling fluid pressure shocks in such a way that a high flow velocity and a continuously changing flow direction is produced for the washing solution on the surface of the carrier body.

It is preferred to utilize impregnating solutions for wetting the carrier body which contain, along with the reagent for the binding of the noxious material components of the hot gas, additives which promote the formation of solid material layers having surface structures favorable to the reaction between waste gas and solid material layer, as is known from catalytically accelerated processes. Such additives can, for example, lead to the formation of a gel with a structure rich in pores or to a skeltetal or reticulated structure upon drying as, for example, is the case with waterglass.

If the hot gas contains noxious components that make it necessary to utilize two or more different kinds of impregnating solutions, which for example might not be missible with each other, for forming the solid material layer, then the carrier bodies are wetted with two or more impregnating solutions. In this case, the impregnation solutions can irrigate in succession from a common supply system or can irrigate from separate supply systems the discharges of which are locally offset one from the other. In irrigation with the impregnating solution, care is taken that all the necessary components of the solid material layer necessary for cleaning of the waste gas should remain accessible to the noxious gas components that are to be bound.

In order to accelerate the necessary drying process of the liquid film, it is possible to use tubes or pipes as carrier bodies which are capable of being heated.

BRIEF DESCRIPTION OF THE DRAWINGS

The invention, which involves an apparatus for carrying out of the process as well as the process itself, is further described, by way illustrative examples, with reference to the annexed drawings, in which.

DESCRIPTION OF THE ILLUSTRATED EMBODIMENTS

Figure 1:
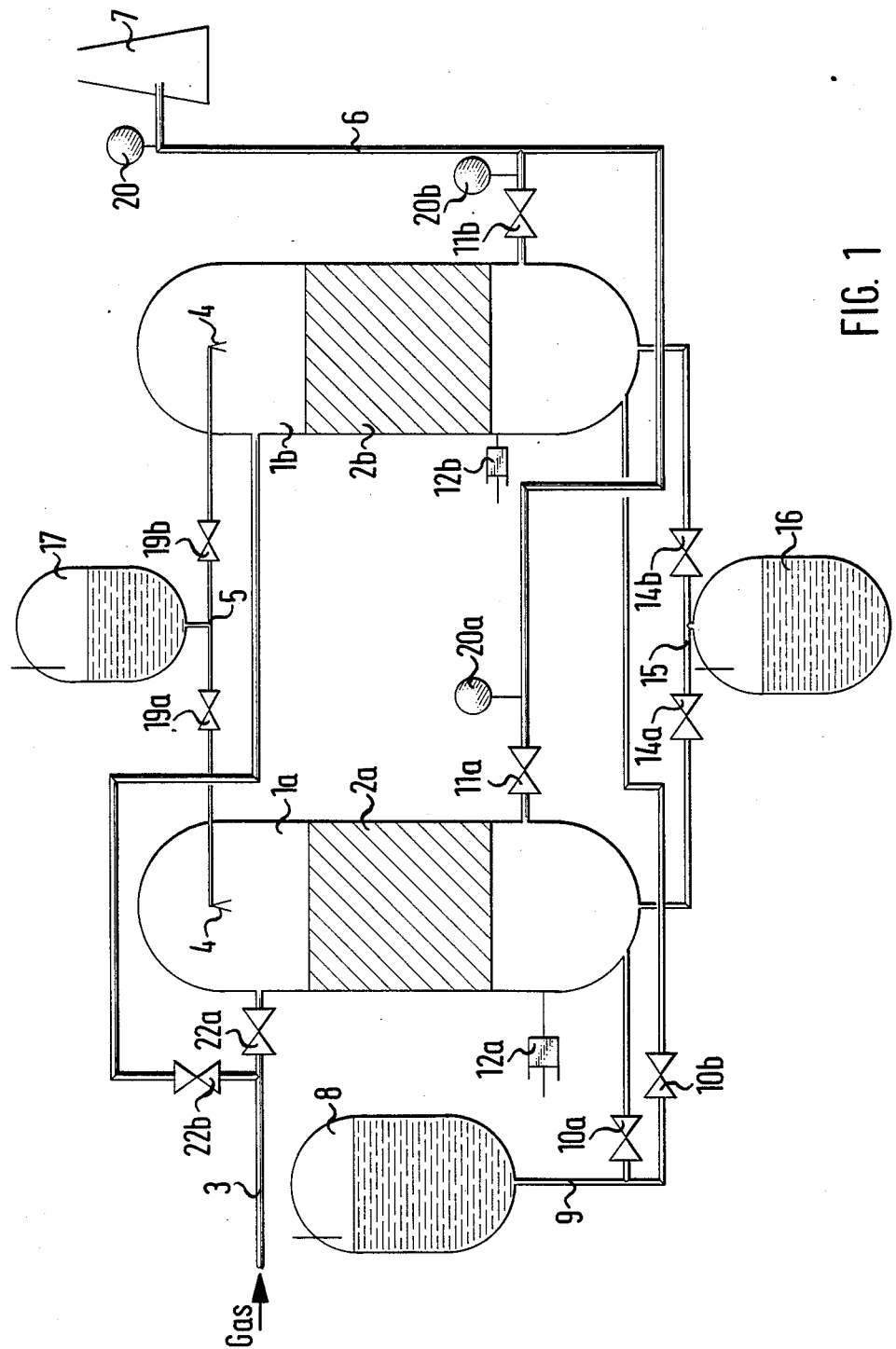
FIG. 1 is schematic diagram of a gas cleaning installation utilizing an aggregate of filling pieces as carrier body for the solid material layer for interaction with the gas to be cleaned.
Figure 2:
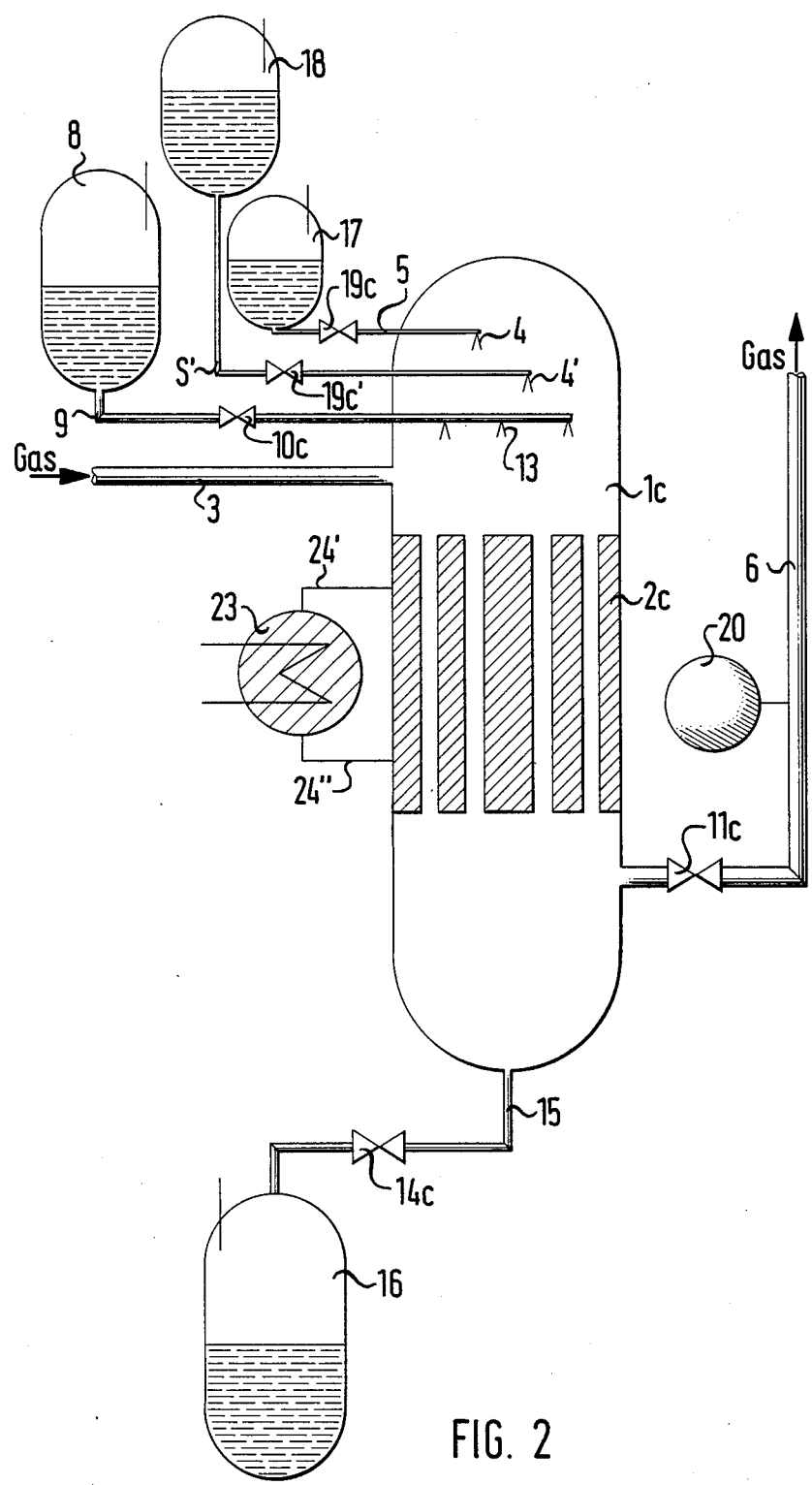
FIG. 2 is a schematic diagram of a gas cleaning installation utilizing trickle-film tubes for establishment of the solid material layer.

FIGS. 1 and 2 schematically represent installations for cleaning hot waste gases. The essential parts of these installations are reactors 1a, 1b and 1c, in which carrier bodies 2a, 2b, and 2c are respectively disposed for the provision of a solid material layer on the carrier bodies. In what follows, such parts of the installations which are related to the respective reactors 1a, 2b and 1c, will be designated not only by a reference numeral but also with one of the letters a, b and c referring to the particular reactor. Installation parts that are utilized unchanged in all illustrated embodiments are designated merely by a reference numeral which is the same in all figures.

The waste gas to be cleaned is brought to the reactors by a supply line 3. Impregnating solution for forming the solid material layers on the carrier bodies 2a, 2b and 2c for reaction with noxious gas components is introduced in all illustrated examples into the reactors by means of distribution nozzles 4. In the example of FIG. 2, impregnating solution is additionally distributed on the carrier bodies 2a, 2b, 2c with distribution nozzles 4,4' fixed on the ends of impregnation medium supply lines 5 and 5'. The liquid film produced on the carrier bodies is dried in a the illustrated examples directly by the hot waste gases flowing into the reactors 1a, 1b, 1c. The hot waste gases flow through the reactors 1a, 1b and 1c in a concurrent flow in the same direction as the impregnating solution introduced by the distribution nozzles 4 and 4'. This way of leading the waste gas flow favors the distribution of the impregnating solution over the entire height of the carrier bodies 2a, 2b and 2c.

The solid material layer produced after the liquid film impregnated on the carrier bodies has dried reacts with the noxious material components of the waste gas in such a way that the noxious components are either bound chemically in the solid material layer or converted into harmless products there. Sodium hydroxide or sodium carbonate solutions, for example, are suitable as impregnating solutions for producing a solid material layer which is suitable for binding noxious gas components. Waterglass or lime can be added to such solutions for forming a solid material structure of large effective surface. The impregnating solutions are to be introduced into the reactors at relatively high concentration for forming the solid material layer. This precaution limits the moistening of the waste gas during impregnation of the carrier body. The solid material layer offers a sufficiently great reaction-ready surface to the waste gas passing by in contact with it. The surface is greater by several orders of magnitude than what corresponds to the geometrical surface of the carrier body occupied by a monomolecular layer. Altogether, it has a better reaction behavior than the liquid film along the surface of which the waste gas flows in the impregnation phase. That is because in contrast to the irrigating film, the noxious gas components enter into reaction with the solid material layer directly and not only after they have penetrated into the liquid trickling down. After the termination of the impregnation phase, and formation of the solid material layer, the waste gas is cleaned in the dry state and there is accordingly no question of any waste gas moistening by evaporating solvent. Water appears in the cleaning of the waste gas and the solid material layer occasionally but only as a reaction product of the reaction of the noxious gas components with the solid material layer.

In the illustrated example according to FIG. 1, there are used as carrier bodies 2a, 2b solid filling shapes such, for example, as Raschig rings, Berl saddles, Intalox saddles, wire spirals, or pellets in a loose layer or heap through which the hot waste gas flows. In the example of FIG. 2 trickle film columns are utilized as the carrier bodies 2c. The impregnating solution irrigates the surfaces of these columns facing the waste gas input and then it is dried. The waste gas is introduced in each case at the top of the reactors 1a, 1b and 1c and is drawn off below the carrier bodies 2a, 2b and 2c. The clean gas flows from all reactors through a clean gas line 6 into a chimney 7 which leads it into the atmosphere.

In order to remove the solid material layer after its reaction with the noxious gas components, a wash solution can be introduced into the reactors 1a, 1b and 1c. The wash or flooding solution is introduced from below in the reactors 1a and 1b. A pipe 9 with shutoff cocks 10a, 10b lead from the supply container 8 for fresh wash solution into the reactors at a place below the outlet connection of the clean gas lines 6. The clean gas lines can be closed by means of the cocks 11a and 11b when one of the reactors is flooded.

Devices 12a and 12b for pulsing the flow of the wash solution are connected to the reactors 1a and 1b in order to make possible the acceleration of the procedure for removing the solid material layers from the carriers.

If the reactor 1a is flooded, the waste gas flows into the parallel connected reactor 1b. The reactor 1b is constituted in the same way as the reactor 1a and operates in parallel with the reactor 1a up to the time of the cleaning phase. If one of the reactors is flooded, the other takes over the entire cleaning of the waste gas.

The irrigation columns set as carrier bodies 2c in the reactor 1c are cleaned by flushing with solution. The washing solution is supplied from a supply container 8 after opening of a shut-off cock 10c, going through the pipe 9 to be introduced above the carrier 2c by washing nozzles 13, thereby releasing the used-up solid material layer. In this rinsing or flushing procedure, the clean gas line 6 is again shut by means of a cock 11c.

After termination of the cleaning phase, the wash solution, sometimes with solid material not yet dissolved which is still in the wash solution, is drained out of the reactors 1a, 1b and 1c through a drain line 15 connected at the lowest points of the reactors, into a collecting container 16, this draining being done after opening up the drain cocks 14a, 14b and 14c.

In the simplest case, water is used as the wash solution. When the noxious material concentration in the wash solution is slight, such an aqueous wash solution can be reused as an impregnating solution in the reactors, if an aqueous impregnating solution is to be used, this being done, of course, after separation of any solid material pieces that might happen to be contained in the used wash solution. It is useful, however, before reusing the wash solution to add fresh impregnation solution. Wash solutions can also be used which have the power of decomposing the solid material layers. Thus, for example, an acid wash solution can be advantageous for acting on solid material layers containing lime.

The impregnating material lines 5 and 5' are connected respectively to the supply containers 17 and 18, out of which the impregnation solutions flow by gravity to the distribution nozzles 4 and 4'. The impregnating solution is introduced intermittently into the reactors. Control valves 19a, 19b, 19c and 19c', which are inserted in the impregnating medium lines 5 and 5', control the time of the coating of new impregnating solution on the carrier bodies 2a, 2b and 2c in a manner dependent upon the proportion of noxious components in the clean gas, by reference to gas analyzers 20, 20a and 20b particularly connected with the clean gas line 6. Each time enough impregnating solution is trickled applied on the filling bodies (serving collectively as the carrier bodies 2a, 2b, and 2c) for a solid material layer capable of reaction to be formed over the entire height of the filling body aggregate or over the entire height of the irrigation columns. In order to obtain this result, it can be useful to subdivide into individual sections the overall solid body layer path through which the waste gas is to flow for cleaning and to provide between each path section some supplementary distribution nozzles for applying impregnating solution on the carrier bodies.

Figure 3:
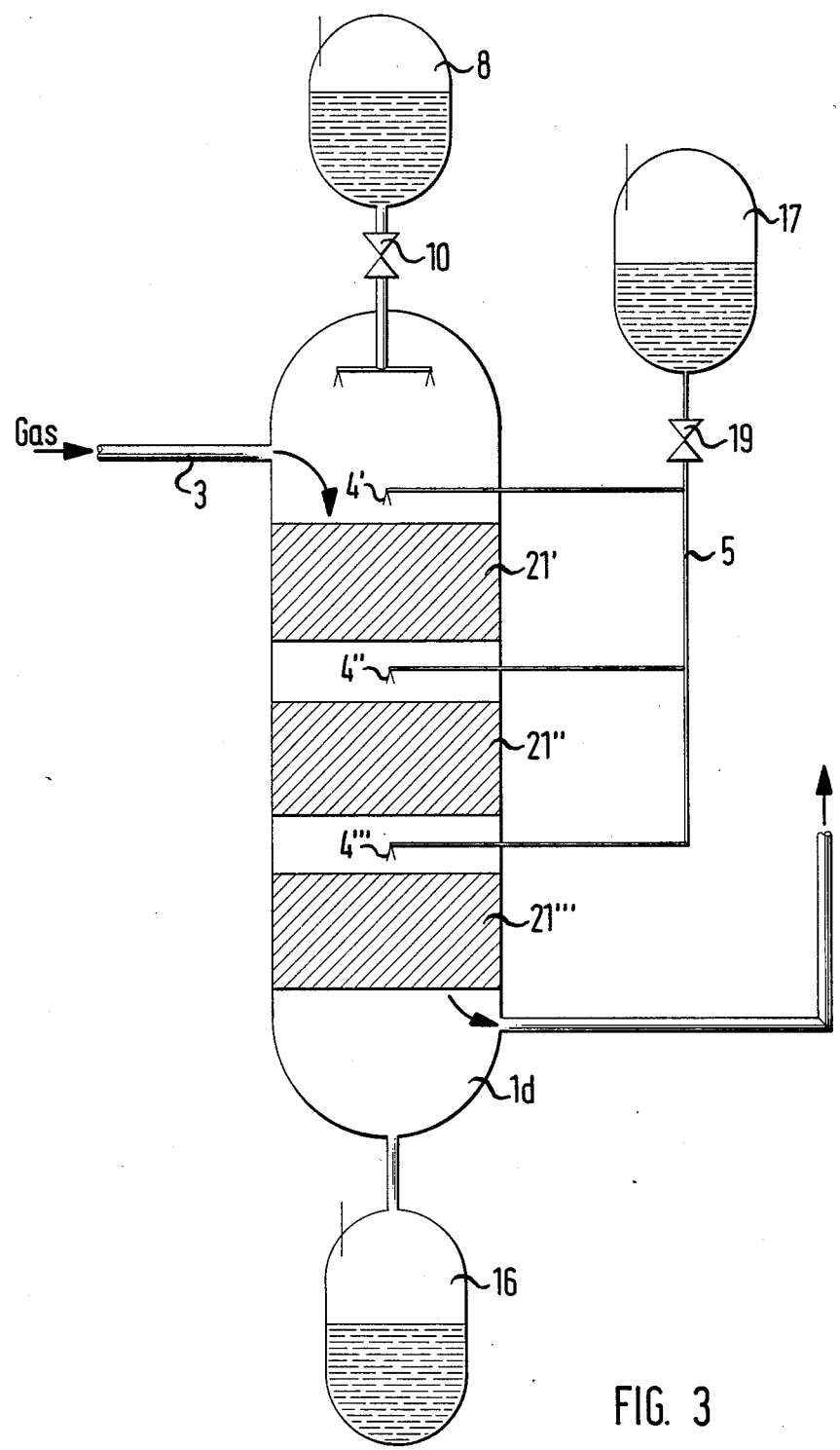
FIG. 3 is a schematic diagram of a reactor with levels disposed one below the other and utilized in tandem in which separate aggregates of filling bodies are located.

In FIG. 3, a reactor 1b with three levels 21', 21" and 21''', each filled with filling bodies, is shown. Between these levels are distribution nozzles 4d', , 4d'' and 4d''' for applying the impregnating solution. The distribution nozzles are connected by the impregnation solution line 5 with a supply container 17 for the impregnation medium. A control valve 19 is located in the impregnation medium line for opening and closing the line. The wash solution is brought out of the supply container 8 through the control valve 10 for delivery to the reactor 1d above the highest filling body layer 21'. The washing down of the used solid material layer corresponds accordingly with the washing procedure for the reactor 1c.

The carrier bodies 2c in the reactor 1c are arranged to be wetted by different impregnation solutions. For this purpose, several impregnation medium lines 5, 5', having mutually offset distribution nozzles 4, 4' discharge into the head of the reactor 1c, the distribution nozzles 4 and 4' being offset in such a way with respect to each other that the impregnation solutions are each separately supplied in uniform film distribution on the irrigation tubes. The supply of a number of impregnation solutions is necessary, for example, when noxious gas components require solid material layers for reaction which are formed of impregnation solutions that are not compatible with each other in the liquid condition, and which, for example, coagulate or produce precipitates when they are mixed.

Separate solution media lines are also advantageous when water glass is used which must be mixed in place with an acid impregnating solution in order to provide a structure rich in pores out of an acid impregnating solution. In this case the water glass solution and the acid impregnating solution are introduced into the reactor by separate solution carrying lines.

During the impregnation phase, the supply of waste gas in the illustrative example of FIG. 1 can be throttled down by means of control valves 22a and 22b or even fully cut off. This precaution can be necessary in order to control the formation of the solid material layer as well as the distribution of the liquid film on the carrier bodies. If the waste gas supply is throttled down or cut off, the other reactor connected in parallel always takes over the cleaning of the residual gas.

For accelerating the drying procedure as well as constituting the solid material layer—especially when the reactor is intended to have only a partial flow or none whatever of waste gas during the drying phase—and likewise also right after the washing phase, it can be useful to provide heating for the carrier bodies. In the reactor 1c there circulates for this purpose in the internal spaces, along the sides of the walls of the irrigation pipes which is not wetted by the impregnating solution, a heatable medium which can be heated in a heat exchanger 23. Heating medium lines 24' and 24'' for the reactor are connected to the heat exchanger 23.

It is also possible, for drying, to provide an individual heating gas flow instead of or along with a part of the waste gases on the side of the carrier bodies which is wetted by the impregnating solution. The carrier body can be put at an optimum reaction temperature for the solid material layer during the cleaning phase either by heating or by cooling. Instead of the heat exchanger 23, a cooler is to be inserted for cooling the medium, for example in the reactor 1c.

EXAMPLE 1

In an experimental apparatus, the construction of which corresponds to the schematically shown reactors 1a and 1b of FIG. 1, 1.5 liters of Raschig rings of 10×10 mm dimensions were provided as carrier bodies. The carrier aggregate had a diameter of 10 cm and a filling height of about 20 cm. As waste gas, $CO_2$ with a noxious component of 800 ppm of HCl, at an input temperature 200° to 250° C. was introduced into the experimental reactor. The quantitative supply of waste gas amounted to 2 m³ $CO_2$/h. The pressure difference across the height of the carrier body aggregate amounted to 100 Pa. Cold saturated $Na_2CO_3$ solution was used as the impregnating solution for building up the solid material layer. In each case 50 ml of impregnating solution was deposited on the carrier bodies per impregnation. After drying of the impregnating solution, there was formed a solid material layer of $Na_2CO_3$, with which the HCl component of the waste gas was converted to NaCl with formation of water and carbon dioxide ($Na_2CO_3 + 2HCl \rightarrow 2NaCl + H_2O + CO_2$).

Thereafter, by reference to a timetable of the cycle of impregnating the carrier aggregate, the dependance of the noxious gas concentration thereby obtained in the cleaned gas coming off, was found as follows:

| Time (min.) | Process Step | Noxious Material Output Content |
| --- | --- | --- |
| 0 | Impregnation with 50 ml | |
| 2 | End of Steam Formation | <10 ppm.HCl |
| 15 | Dry Waste Gas, Dry Layer | <10 ppm.HCl |
| 25 | " | 25 ppm.HCl |
| 30 | " | 40 ppm.HCl |
| 35 | " | 60 ppm.HCl |
| 40 | " | 60 ppm.HCl |
| 45 | Reimpregnation with 50 ml | |
| 48 | End of Steam Formation | <10 ppm.HCl |
| 50 | Dry Waste Gas, Dry Layer | <10 ppm.HCl |
| 60 | " | <10 ppm.HCl |
| 70 | " | 15 ppm.HCl |
| 80 | " | 40 ppm.HCl |
| 90 | Shutting Down, Cooling Off & Washing (It would have been possible to provide further reimpregnations) | |

Water was used as the washing solution. After cleaning of the solid material layer, the washing solution contained the noxious materials in relatively high concentration. The washing solution can be treated further by chemical wet processing. In the process of the invention, there are obtained independently of each other, on the one hand, the cleaning of the hot gases by reaction with a solid material layer in the dry condition, or under only slight moistening of the waste gases and, on the other hand, the further treatment of the noxious materials by wet chemistry methods without reaction back on the cleaned waste gas. In the illustrated example, only two minutes out of the entire 45 minutes required for gas cleaning was needed for the formation of the solid material layer. Only within this relatively short time was moistening of the waste gases to be counted as a cost of the operation. The waste gases were thus advantageously cleaned essentially in the dry state even at high waste gas temperatures, while the separated noxious materials could be removed from the reactor by wet chemistry.

In the case of the installation illustrated in FIG. 2, only the reactor 1c is provided for gas cleaning. Of course, in this case also, as in the case of FIG. 1, an additional reactor can be connected in parallel in order to provide continuous waste gas cleaning even during the cleaning phase of one of the reactors or when the waste gas flow in one reactor is throttled down or shut off and also during the impregnation phase of the carrier body in a reactor.

Once the carrier bodies are wetted, irrigation with the impregnation solution is interrupted and the solution is dried on the carrier bodies. When the gas reaction at the solid material layer thus formed weakens the stationary carrier bodies are again irrigated with impregnation solution and then dried. After many repeated impregnations the solid material layer is washed away by flushing the carrier bodies with a wash solution.

Figure 4:
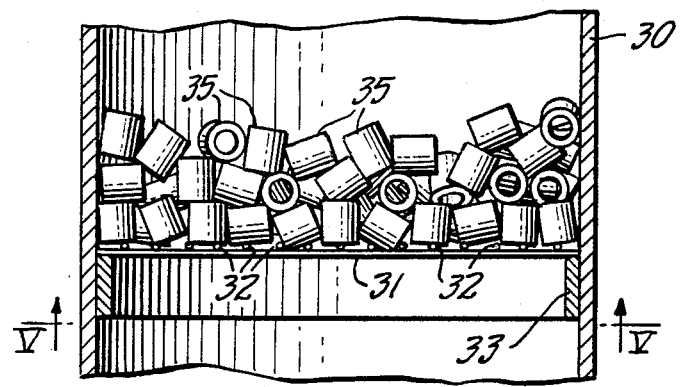
FIGS. 4 and 5 are respectively a cross-section and a bottom view of one usable kind of open aggregate of carrier bodies.
Figure 5:
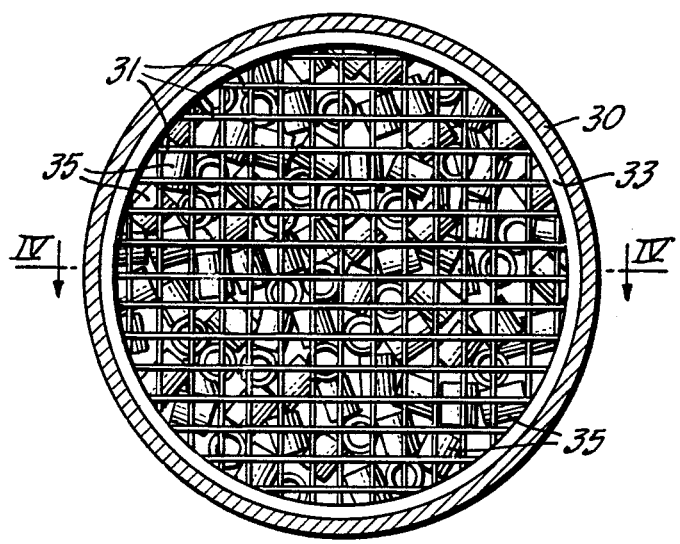

FIG. 4 is a cross-section of an aggregate of one particular kind of carrier body suitable for the process and apparatus of the invention FIG. 5 is a bottom view of the same. There is shown the reactor wall 30, a supporting grid made up of lower rods or stiff wires 31 and upper rods 32 resting on a support ring 33 and a packing of hollow cylindrical carrier bodies (Raschig rings) 35, e.g. Berl saddles, Intalox saddles. These figures show the carrier bodies as simply allowed to fall into place to form a packing through which there are many passages for gas flow. The art of utilizing packing of inert pieces in chemical reactors for either concurrent flow or counter flow is well known and the various possibilities need not be mentioned further. The material for the carrier bodies is desirably chemically inert and consequently is preferably, glass, metal (steel), ceramic and a chemically inert plastic such as TFE.

We claim:

1. Method of cleaning gas containing noxious matter by contact of said gas with a solid reagent-containing material layer adhering on carrier bodies, in which said layer requires formation thereof on said bodies by wetting said bodies with a solution of said material followed by drying of said solution on said bodies and also requires removal and replacement when reagents in said layer become spent, said method being composed of steps performed in the same reactor vessel and including the steps of:

providing carrier bodies in stationary operating positions in a gas-cleaning reactor vesssel, said carrier bodies being bodies selected from the group which consists of tubes, pipes, trickle film columns, Raschig rings, Berl saddles, Intalox saddles, and wire spirals, and being made, of chemically inert material selected from the group which consists of glass, ceramic, metal and plastic, and said operating positions being disposed in said vessel so as to require said gas to pass by and adjacent to said stationary-positioned bodies when said gas is caused to pass through said vessel;

irrigating said carrier bodies, from above, in their said stationary positions with a said solution containing a reagent for reacting with at least one noxious substance contained in said gas, continuing irrigation until said carrier bodies are wetted by said solution;

drying said reagent-containing solution on said carrier bodies and thereby producing a solid material layer thereon;

passing said gas through said vessel for cleaning noxious matter therefrom by reaction with said reagent of said solid material layer;

irrigating and wetting said carrier bodies anew with said solution after reaction of said noxious matter with said reagent weakens, followed by repetition of the above-stated drying and gas cleaning steps;

repeating the above-stated sequence of an irrigation step followed by drying of said solution and gas cleaning as above set forth;

after at least one repetition of said sequence of steps, washing out spent residues of said layers on said carrier bodies by contact with a washing solution while said carrier bodies remain in said stationary operating positions in said reactor vessel, and then repeating at least once, in the same reactor vessel, the above-stated sequence of irrigation, solution drying, gas cleaning and spent residue washing-out steps.

2. Method according to claim 1, wherein said hot gas containing noxious matter is passed through said vessel while performing the drying of said solution on said surfaces of said carrier bodies.

3. Method according to claim 1, wherein said step of washing out spent residues of said solution of said carrier bodies is performed by flushing said carrier bodies with said washing solution.

4. Method according to claim 3, wherein flooding said carrier bodies with said washing solution is also used for cleaning said residues of said carrier bodies.

5. Method according to claim 4, wherein said flooding of said carrier bodies with said washing solution is performed by supplying said washing solution in repeated pulses of heavy flow.

6. Method according to claim 1, wherein said solution contains additives for producing an extended surface area structure of the solid layer formed by the dried residue of said solution.

7. Method according to claim 1, in which said step of irrigating said carrier bodies in their said stationary positions with an solution is performed with a plurality of solutions each containing a different reagent for reacting with at least one noxious substance contained in said gas.

8. Method according to claim 1, wherein said carrier bodies are tubes and the step of drying said solution is performed by heating said tubes from the inside.

9. Method according to claim 1, wherein the said sequence of an irrigation step followed by drying of said solution and gas cleaning is repeated a plurality of times, after which a said step of washing out spent residues of said layers on said carrier bodies is performed.

* * * * *